Patented Apr. 3, 1951

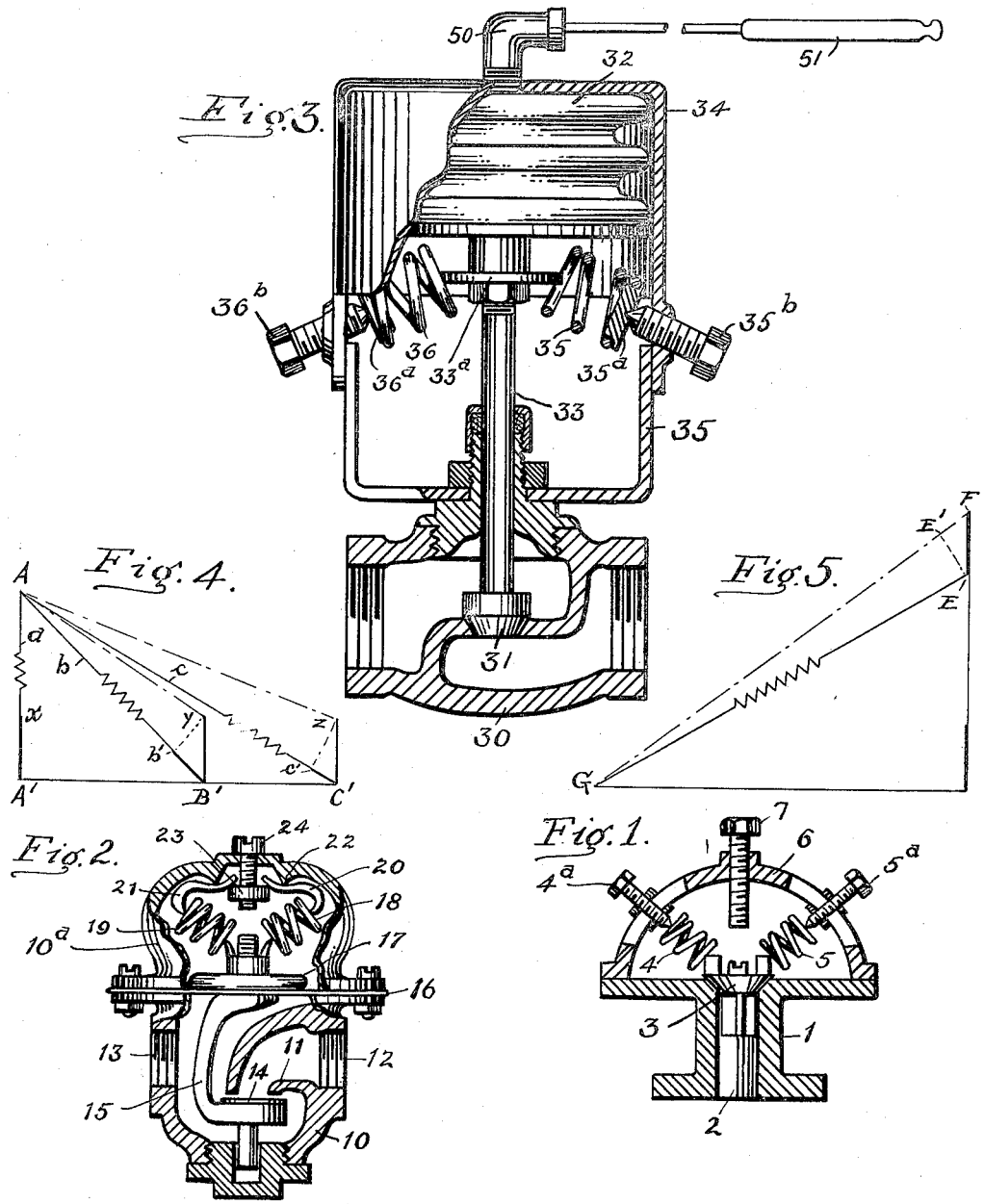

2,547,882

UNITED STATES PATENT OFFICE 2,547,882

MEANS FOR REGULATING TEMPERATURE AND PRESSURE OPERATED VALVES

Orlo Clair Norton, Erie, Pa.

Application April 30, 1945, Serial No. 591,025

4 Claims. (Cl. 236—99)

My present invention has for its object to provide a novel type of control for valves intended for automatic operation to regulate the flow of fluid in the conduits to which they are connected and it is applicable alike to valves which are governed thermally, or which are used in conduits for relieving excess pressure, or as a pressure reducing means.

More specifically my invention provides a means which is capable of sensitive adjustment for exerting a pressure on a valve head to hold it in its initial position relative to its seat which may be applied directly to the valve head in connection with so called pop or relief valves, or may be used in conjunction with the diaphragm controls employed for pressure reducing purposes and those regulated by changes in temperature.

To these and other ends my invention embodies further improvements in construction as will be more fully described in the following specification, the novel features thereof being set forth in the appended claims.

In the drawings:

Fig. 1 is a sectional view of a pop valve showing my pressure regulating means applied thereto.

Fig. 2 is a sectional view of a pressure reducing valve embodying my invention.

Fig. 3 is a view partly in section of a thermally controlled valve showing one adaptation of my invention.

Figs. 4 and 5 are diagrams employed for the purpose of facilitating the description of the action of springs arranged in accordance with my invention and serving with different types of valves.

Similar reference numerals in the different figures indicate similar parts.

The desideratum to be achieved in a valve control mechanism is an arrangement of parts whereby a desired pressure can be set to determine the initial movement of the valve head and which acts to maintain a constant pressure thereon irrespective of the distance the valve head may be displaced relatively to its seat. This I accomplish by an arrangement of springs mounted in an angular position to the line of movement of the valve head which as they are caused to function by its movement have a limited tilting or rotary travel about their supporting points, said movement tending to reduce their initial or set pressure so that after the valve head has left its seat its further movement creates but little or no additional resistance beyond that required to restore it to its original closed position.

In the types of valves to which my invention is well adapted the maximum movement of the valve head with relation to its seat is comparatively small. In general it is a rule with valve manufacturers to make this movement one quarter of the diameter of the valve seat opening. For a one inch valve, therefore, the maximum opening is one quarter of an inch. If a coil spring arranged axially of the valve stem is employed it must needs be strong enough in its expanded position to counteract a given pressure exerted on the underside of the valve head, i. e. its initial adjustment must be such as to allow the valve head to open when the pressure thereon exceeds a selected number of pounds. It will be seen therefore that beginning with the slightest movement of the valve head the resistance of the spring begins to increase and its resistance builds up rapidly the farther the valve head moves. It is due to this fact and to the difficulty of adjusting such a coil spring in the first instance that many valves have an irregular action and often "simmer" at the beginning of their opening movement and either "hang" in this position indefinitely, or finally "jump" to a full open position when a quarter, half, or other fractional opening is all that is required.

I have found in practice that by using a spring placed at an angle of 45°, or thereabouts, to the axial movement of a valve head a very different condition arises inasmuch as the opening movement of the valve head for its full distance the distance through which the spring is compressed is only slightly more than one half that amount, or approximately 62.5 per cent. By laying the spring at a more obtuse angle, say at 30°, for the same relative movement of valve opening it is only shortened 43.75 per cent of the distance an axial spring would be compressed. These relative distances are illustrated in Fig. 4 in which the lines $a$, $b$, and $c$ represent springs resisting equal loads, disposed vertically and at angles of 45° and 30° respectively to a common stationary point A, their lower ends bearing upon and resisting movement to load points A', B', and C'. As a matter of comparison letting $x$—A'; $y$—B'; $z$—C' represent equal distances of travel in the opening of three different valves, the following will be seen. Spring $a$ is compressed the maximum distance; spring $b$ swings about A as a pivot as its opposite end travels from B' to $y$ and that its maximum compression is the distance represented by the line B'—$b'$. Observing spring $c$ it is seen that as its lower end moves from C' to $z$, it, by reason of its greater angular position, is compressed a shorter distance, represented by line C'—$c'$.

Part of the effect I produce is accomplished by disposing a spring at an angle initially and part from the fact that during its compression the fixed angle, at which it is adjusted to exert its greatest pressure, changes so that although the spring is compressed, a compensatory effect occurs. With a spring set at 45° the swinging movement of a spring, I have demonstrated in practice for all practical purposes, compensates for the compression imparted to the spring by the opening of any valve, the result being that a valve may open partially and continue to move in the same direction without meeting increased resistance.

It will also be seen that these forces may be changed relatively to each other by increasing or decreasing the initial setting of a spring; i. e. with a steeper angle there will be an increase of spring resistance and a lessening of the compression derived from the swing of the spring, whereas, by selecting a more obtuse angle the compensatory action increases and the compression of the spring decreases until an angle of 90° is reached. In this position a spring would be in a horizontal position and exerts no downward thrust and is practically inert.

In practice I employ two or more springs disposed symmetrically of the axis of movement of the valve head and in which position they may bear directly on the valve head, as shown in Fig. 1, or against the valve stem, as shown in Fig. 3, without cramping its movement.

The simplest adaptation of my invention is seen in Fig. 1 which pictures a relief or safety valve comprising a body 1 having a central passage 2 which is normally closed by a valve head 3. The valve head 3 is held against its seat by the two angularly disposed springs, 4 and 5, the outer ends of which bear against and are supported on the inner ends of adjusting screws 4a—5a which pass through slots in an arch 6 and are held in their adjusted position thereon by lock nuts as shown. Extending through the top of the arch 6 is a screw 7 which limits the opening movement of the valve head. By means of the bearing members 4a, 5a which are movable inwardly and outwardly and also angularly relative to each other, I am able to regulate the tension in the springs 4, 5 to counterbalance any given pressure in the conduit leading to the valve head. By reason of the angular disposition of the springs their pressure is greatest when the valve is closed and as the valve head rises the rotary movement permitted in the springs is reduced due to the change in the angle of thrust against them. In practice I have found that this arrangement of parts results in a firm reseating of the valve head after each operation and the elimination of chatter and leaking.

In the pressure reducing valve illustrated in Fig. 2 my invention in a modified form is shown applied to a diaphragm controlled valve. Here the valve casing is indicated by 10 having a valve seat 11 between its inlet 12 and outlet 13. Playing there against is a valve head 14 carried on an arm 15 depending from the lower side of a diaphragm 16 to which it is secured by a nut 17 resting upon the upper side of the diaphragm. The latter is secured in the parting line between the body 10 and a globular cover 10a. Within the cover are two angularly disposed springs 18 and 19. Their lower ends are closed and bear at their center upon horns diverging outwardly from the hub of the nut 17. The outer ends of the springs are also closed and likewise bearing against their centers are the outer ends of lever arms 20 and 21 which are pivoted against the edge of an inwardly projecting annular rim 22 on the cover 10a. The contiguous free ends of the arms 20, 21 rest upon a nut 23 carried on a cap screw 24 centrally entering the cover and adjustable exteriorly thereof for the purpose of regulating the tension on the two springs.

In this assembly of the parts it will be observed that the desired adjustment of the valve with relation to its seat may be set for control by the diaphragm and its movement in turn controlled by the adjustment of the springs through the lever arms affected by the inward or outward movement of the nut 23 on the screw 24. The angular disposition of the springs 18, 19 and their free turning movement on their end points of engagement permits a delicate adjustment of their operation to be effected in the first instance is not unduly increased which upon the slight increase in compression which is imparted to the springs by the upward movement of the diaphragm.

A very practical and useful application of my invention is found in its adaptation to thermally operated valves one form of which is shown in Fig. 3 as it becomes possible thereby to effect an adjustment of the control which responds to very slight variations in temperature.

In Fig. 3, I have shown the valve, comprising the body 30 having a valve head 31 which is opened and closed by the ultimate contraction and expansion of a bellows form of diaphragm 32 connected to the upper end of valve stem 33. The diaphragm is held in a hood 34 supported on the valve body by a frame 35. Communicating with the interior of the bellows is a vent 50 which is connected to a vapor pressure line of piping or a feeler bulb 51 and the bellows itself may contain a volatile liquid sensitive to thermal changes in said piping. The latter it is understood is connected to an apparatus casing, a room, a jacket casing or the like in which it is desired to maintain a temperature as nearly constant as possible. It is when this temperature of an apparatus changes that the fluid or gas in the piping 36 expands or contracts to effect a corresponding movement of the bellows 32.

The stream line, represented by the valve body 30, feeds the radiating coils in the apparatus which is being controlled and the steam therein is necessarily carried at some adequate pressure and may vary in different installations according to the type of apparatus being served. Originally the thermal control apparatus is set so that the normal vapor pressure carried in the line for any given desired temperature operation, together with the elasticity of the bellows, balances the pressure exerted against the underside of the valve head 31, by the stream pressure in the body 30, and maintains the valve head in the closed position. In practice, however, it is found that the above statement is somewhat theoretical and for mechanical reasons the valve head must be held closed against a given steam pressure in the inlet conduit.

Thermally controlled valves of this character may have an operating range of 10 degrees in the vapor line away from an initial setting of, say, 70 degrees Fahrenheit or such other degree as may be selected for the optimum temperature of the apparatus under thermal control. This means that upon a drop of one degree it will permit the valve head to open one tenth of its maximum. Hence, it will be seen that until a temperature drop of 10 degrees in the vapor line occurs there is no way of obtaining a full opening of the valve. This is a serious menace in the operation of many machines which are subjected to rapid temperature changes by the application of various "loads" (such as occurs in bottle sterilizers). In the valve so far described there is the ever present tendency to create a stuttering action in the opening movement of the valve which may continue over a matter of minutes between its successive steps, the actual time required depending on the responses in contraction of the volume of liquid and gas in the vapor line. Conversely the subsequent closing of the valve likewise occurs in steps as the pressure in the vapor line increases with a rising temperature.

Besides the fluctuation in the pressure in the vapor line there is the factor of friction occurring in the bellows 32, itself and that created by the movement of the stem 33 in its packing gland.

I have found that by applying springs in accordance with my invention to the aforedescribed thermal control valve it is possible to greatly increase its sensitivity throughout its range of operation. To this end I provide the valve stem 33 with a fulcrum point at each side created by securing to it a plate 33a, preferably in the form of a disc, against opposite sides of which bear the open ends of coil springs 35 and 36 extending downwardly at divergent angles of approximately 30°. The outer ends of the springs are seated on discs 35a and 36a, balanced at their centers on the pointed ends of cap screws 35b and 36b, threaded in angular openings diametrically disposed in the yoke or frame 35. In this arrangement of the parts it will be observed that the compression of the springs may be regulated nicely to just the point required to overcome the natural mechanical lag in the movement of the bellows 32. In operation it will be seen that as the valve head begins to leave its seat the pressure angle of the springs 35, 36 with relation to the stem 33 begins to lessen, hence the spring force acts to compress the bellows 32 slightly which is equivalent to decreasing the pressure in the vapor line. Since in beginning the release of the valve head 31 the liquid and gas in said vapor line had already started to contract in volume, thereby initiating the opening movement of the valve, further compression by pressure on the bellows is not resisted and the valve is permitted to open instantly, substantially to its full extent. A conventional feeler bulb 51 is shown connected to the bellows connection 50.

In addition to assisting in the opening movement of the valve the angular disposition of the rocking springs plays an important part in governing the closing movement of the valve against its seat. At such times it will be seen that swinging of the springs about their pivotal points results in a very gradual application of their compressional force.

The last mentioned effect is illustrated in the diagram (Fig. 5) wherein the total vertical movement of the valve is exaggerated in the vertical line E—F. One of the springs, 36, is represented as being pivoted at G and having an expansion equal to E'—F when the valve is open to its fullest extent. This it will be seen is much less than the movement from E to F which would be required if an axially disposed spring were used. Conversely in the closing of the valve the compression of the spring is less and as this occurs during the angular movement of the spring from E' to E, a compensatory effect occurs which cannot be obtained when using a spring disposed axially of the valve head.

In the above described arrangement of parts it will be seen that in a thermally controlled valve the diagonally disposed springs may be adjusted initially to control the opening movement of the valve head by balancing off the lag or inertia to temperature changes in the vapor pressure system so that the latter will begin to open the valve 33 upon slight temperature changes. Likewise when the vapor system is influenced to close the valve it may begin to act in that direction and finally effect a very gradual closing. It is, of course, understood that in the various stages of valve operation referred to, there is a relationship between the pressure exerted beneath the valve head 31 and the maximum pressure exerted by springs 35, 36.

I claim:

1. In a thermally controlled valve, in combination, a valve body having a seat, a valve stem, a valve head on said stem engaging said seat, a temperature responsive device connected to the end of said stem for seating said valve head on said seat, said temperature responsive device being responsive to the temperature of the fluid controlled by said valve, two oppositely disposed, counterbalanced coil springs normally at divergent angles on opposite sides of said valve stem, means for pivoting the inner ends of said springs on said valve stem, and adjustable means for pivoting the opposite outer ends of said springs and adjusting the tension of said springs, said springs opposing the longitudinal movement of said stem to seat said valve head with a predetermined progressively decreasing counterforce until said springs are in substantial longitudinal alignment and aiding the longitudinal movement of said stem to move said valve head to an open position with a predetermined progressively increasing longitudinal force.

2. In a thermally controlled valve as set forth in claim 1 wherein said temperature responsive device comprises an expansible bellows connected to said valve stem.

3. In a thermally controlled valve as set forth in claim 1 wherein the adjustable means for adjusting the tension of said springs comprises angularly disposed, pointed screw bolts in engagement with recesses in disks carried on one end of said springs.

4. In a thermally controlled valve as set forth in claim 1 wherein the means for pivoting said springs on said stem comprises an outwardly extending flange.

ORLO CLAIR NORTON.

REFERENCES CITED

The following references are of record in the file of this patent:

UNITED STATES PATENTS

| Number | Name | Date |
|---|---|---|
| 306,568 | Wilder | Oct. 14, 1884 |
| 322,084 | Wilder | July 14, 1885 |
| 627,390 | Cash | June 20, 1899 |
| 904,123 | Fulton | Nov. 17, 1908 |
| 1,613,879 | Engstrom | Jan. 11, 1927 |
| 1,752,390 | Nelson | Apr. 1, 1930 |
| 1,927,036 | Johnson | Sept. 19, 1933 |
| 2,268,359 | Tustin et al. | Dec. 30, 1941 |
| 2,333,993 | Frailing | Nov. 9, 1943 |

FOREIGN PATENTS

| Number | Country | Date |
|---|---|---|
| 2,140 | Great Britain | June 18, 1873 |
| 18,670 | Great Britain | Sept. 15, 1905 |